(12) United States Patent
Son

(10) Patent No.: US 7,180,540 B2
(45) Date of Patent: Feb. 20, 2007

(54) METHOD OF MANAGING DATA FILES USING REPRESENTATIVE VOICE WITHIN PORTABLE DIGITAL APPARATUS

(75) Inventor: Hyuk-soo Son, Seongsnam-si (KR)

(73) Assignee: Samsung Technin Co., Ltd. (KR)

( * ) Notice: Subject to any disclaimer, the term of this patent is extended or adjusted under 35 U.S.C. 154(b) by 804 days.

(21) Appl. No.: 10/630,826

(22) Filed: Jul. 30, 2003

(65) Prior Publication Data

US 2004/0145863 A1 Jul. 29, 2004

(30) Foreign Application Priority Data

Jul. 31, 2002 (KR) ...................... 10-2002-0045282

(51) Int. Cl.
*H04N 5/76* (2006.01)
(52) U.S. Cl. ................. 348/231.4; 348/231.2
(58) Field of Classification Search .......... 348/231.99, 348/231.2–231.6; 707/100
See application file for complete search history.

(56) References Cited

U.S. PATENT DOCUMENTS

| | | | | |
|---|---|---|---|---|
| 5,784,525 | A * | 7/1998 | Bell | 386/107 |
| 6,128,037 | A * | 10/2000 | Anderson | 348/231.4 |
| 6,167,469 | A | 12/2000 | Safai et al. | |
| 6,169,575 | B1 * | 1/2001 | Anderson et al. | 348/231.2 |
| 6,380,975 | B1 | 4/2002 | Suzuki | |
| 6,606,411 | B1 * | 8/2003 | Loui et al. | 382/224 |
| 6,774,939 | B1 * | 8/2004 | Peng | 348/231.4 |
| 6,912,002 | B1 * | 6/2005 | Soga | 348/231.2 |
| 6,965,403 | B2 * | 11/2005 | Endo | 348/231.2 |
| 6,970,192 | B2 * | 11/2005 | Takayama | 348/231.2 |
| 7,084,916 | B2 * | 8/2006 | Morimoto et al. | 348/333.01 |
| 2002/0080252 | A1 * | 6/2002 | Nagaoka et al. | 348/232 |
| 2002/0172502 | A1 * | 11/2002 | Okamoto et al. | 386/95 |
| 2002/0184325 | A1 * | 12/2002 | Killcommons et al. | 709/206 |
| 2003/0063198 | A1 * | 4/2003 | Yokokawa | 348/231.2 |
| 2003/0161617 | A1 * | 8/2003 | Um et al. | 386/121 |
| 2006/0114339 | A1 * | 6/2006 | Ohmura et al. | 348/231.99 |

FOREIGN PATENT DOCUMENTS

| | | |
|---|---|---|
| KR | 1998-0067064 | 10/1998 |
| KR | 1999-0049718 | 7/1999 |
| KR | 10-0227535 | 11/1999 |
| KR | 2001-0081247 | 8/2001 |

* cited by examiner

*Primary Examiner*—Vivek Srivastava
*Assistant Examiner*—Timothy J. Henn
(74) *Attorney, Agent, or Firm*—Tuchman & Park LLC

(57) ABSTRACT

A method of managing a user's data files in a portable digital apparatus which can receive and discharge a recording medium and has a display device. In the method, first, when a representative-voice request signal is received from a user, a new directory and a representative-voice file corresponding to the new directory are produced or stored in the recording medium. Next, the user is guided to record a representative voice message for the directory, and simultaneously, user's representative-voice recording data produced from the voice message are stored in the representative-voice file. Thereafter, if user data files are produced, the produced user data files are stored in the new directory. Then, if a reproduction-mode signal used to reproduce the data files is received from the user, a representative data file of each of the directories is displayed, and the representative-voice file corresponding to the directory of a representative data file selected by the user is reproduced.

9 Claims, 15 Drawing Sheets

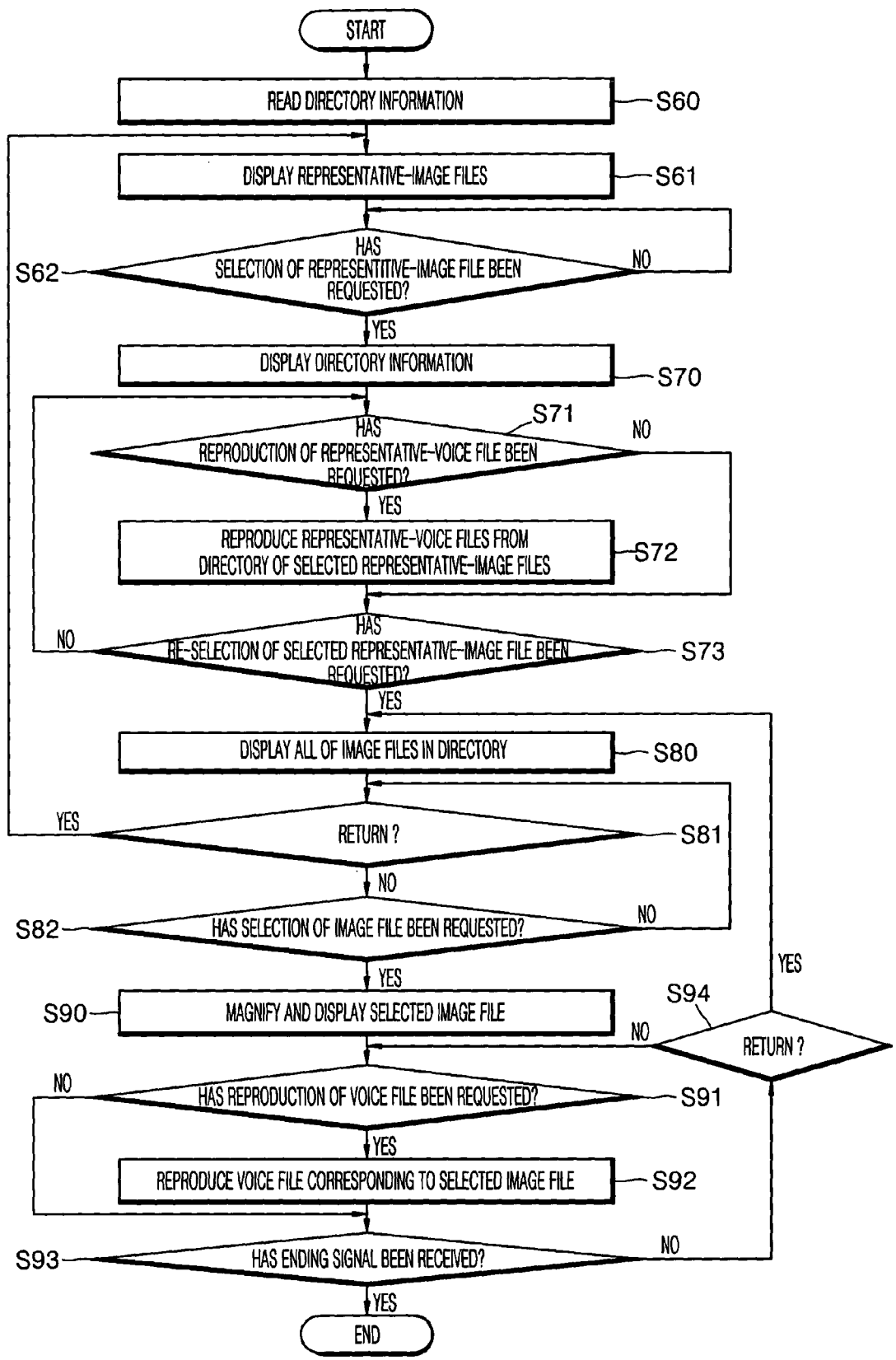

METHOD OF MANAGING DATA FILES USING REPRESENTATIVE VOICE WITHIN PORTABLE DIGITAL APPARATUS

CROSS-REFERENCES TO RELATED APPLICATIONS

This application claims priority from Korean Patent Application No. 2002-45282 filed on Jul. 31, 2002, in the Korean Intellectual Property Office, the disclosure of which is incorporated herein in its entirety by reference.

BACKGROUND OF THE INVENTION

1. Field of the Invention

The present invention relates to a method of managing a user's data files in a portable digital apparatus, and more particularly, to a method of managing a user's data files in a portable digital apparatus (e.g., a digital camera) which can receive and discharge a recording medium and includes a display device.

2. Description of the Related Art

A portable digital apparatus, for example, a digital camera typically has a limited user input function. Hence, users cannot easily manage their data files stored in the portable digital apparatus. Accordingly, users must use other apparatus such as a personal computer in order to manage data files that are stored in a portable digital apparatus. Also, users must reproduce all of the data files stored in a recording medium in order to search for a specific data file.

SUMMARY OF THE INVENTION

The present invention provides a method of managing data files in a portable digital apparatus, by which the user of the portable digital apparatus can easily manage his or her data files without the need to use another apparatus.

According to an aspect of the present invention, there is provided a method of managing the user's data files in a portable digital apparatus which can receive and discharge a recording medium and has a display device. In the method, when a representative-voice request signal is received from a user, a new directory and a representative-voice file corresponding to the new directory are produced in the recording medium. The user is guided to record a representative voice, and the resulting representative-voice recording data is recorded in the representative-voice file. Thereafter, when subsequent user's data files such as image files with or without accompanying voice data are produced, for example, by photographing a subject, they are further stored in the new directory. When a reproduction-mode signal for reproducing the data files is received from the user, a representative data file of each of the directories stored in the recording medium is displayed, and the representative-voice file corresponding to the directory of a representative data file selected by the user are reproduced.

In the data file managing method according to the present invention, the user's data files are stored in the directory corresponding to the representative-voice file, the representative-data file of each of the directories is displayed in a reproduction-mode, and a representative-voice file is reproduced according to a reproduction request signal generated by a user. Thus, the user of a portable digital apparatus can easily manage his or her data files without using an additional apparatus.

BRIEF DESCRIPTION OF THE DRAWINGS

The above-described and other objects and advantages of the present invention will become more apparent by describing in detail preferred embodiments thereof with reference to the attached drawings in which:

FIG. 13 is a flowchart for illustrating a data file reproduction algorithm performed in the digital signal processor of FIG. 4;

DETAILED DESCRIPTION OF THE INVENTION

Figure 1:
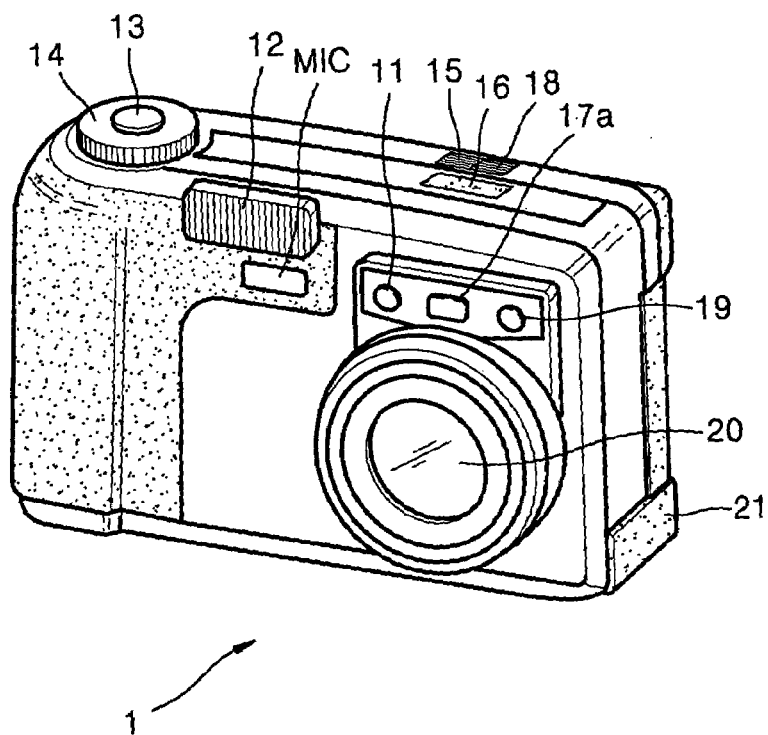
FIG. 1 is a perspective view showing the front external appearance of a digital camera incorporating an embodiment of the present invention.

Referring to FIG. 1, the front side of a digital camera 1, which is an embodiment of a portable digital apparatus according to the present invention, is depicted. The digital camera 1 includes a microphone MIC, a self-timer lamp 11, a flash 12, a shutter button 13, a mode dial 141 a function-selection button 15, a photographing-information display unit 16, a view finder 17a, a function-block button 18, a flash-light amount sensor 19, a lens unit 20, and an external interface 21.

The self-timer lamp 11 is illuminated during a self-timer mode for a set period of time ranging from when the shutter button 13 is pressed down to when a shutter starts to operate. The mode dial 14 is used by a user to select and set up various modes, for example, a still image photographing-mode, a night view photographing-mode, a moving image photographing-mode, a reproduction-mode, a computer connection mode, and a system setting mode. The function-selection button 15 is used by the user to select a desired one from the operating modes of the digital camera 1, for example, a still image photographing-mode, a night view photographing-mode, a moving image photographing-mode, and a reproduction-mode. The photographing-information display unit 16 displays a variety of photographing-related information. The function-block button 18 is used by the user to select each function if a status display panel which displays the operation status of each function exists. The digital camera 1 of FIG. 1 does not include such a status display panel.

Figure 2:
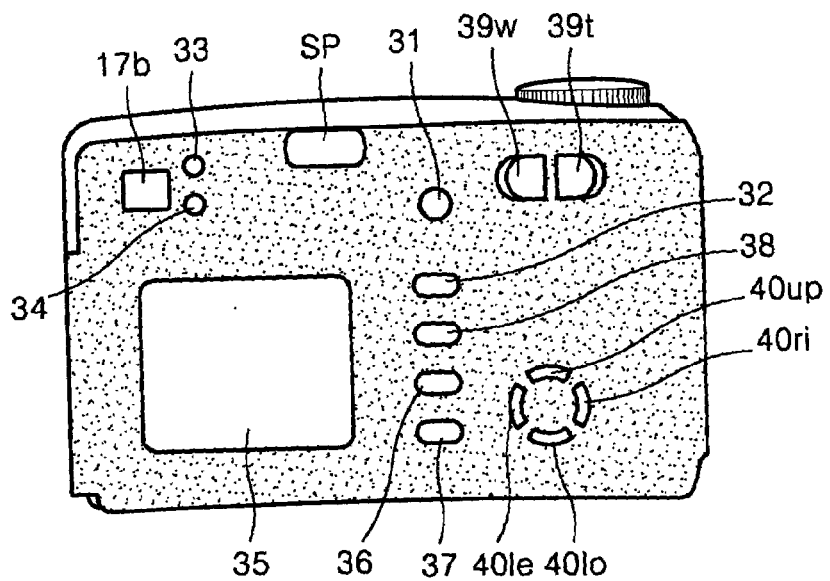
FIG. 2 is a view of the rear external appearance of the digital camera of FIG. 1.

Referring to FIG. 2, the rear side of the digital camera 1 includes a representative-voice button (not shown for purposes of simplicity and clarity), a speaker SP, a power button 31, a monitor button 32, an auto-focusing lamp 33, a view finder 17b, a flash standby lamp 34, a display panel 35, a confirmation/cancellation button 36, an enter/reproduction button 37, a menu button 38, a wide angle zoom button 39w, a telephoto-zoom button 39t, a moving-up button 40up, a moving-right button 40ri, a moving-down button 40lo, and a moving-left button 40le.

When a user presses the representative-voice button, a representative-voice request signal is generated, commanding production of a new directory and a representative-voice file corresponding to the new directory.

The monitor button 32 is used by the user to control the operation of the display panel 35. If the user presses the monitor button 32 for a first time after power is applied, for example, the image of the object and information about the photographing features of the object are displayed on the display panel 35. If the user presses the monitor button 32 a second time, only the image of the object is displayed on the display panel 35. If the user presses the monitor button 32 a third time, the power applied to the display panel 35 is disconnected. The auto-focusing lamp 33 turns on when it is in complete focus. The flash standby lamp 34 turns on when the flash 12 of FIG. 1 is in an operation standby state. The confirmation/cancellation button 36 is used as either a confirmation button or a cancellation button when the user sets up each mode. The enter/reproduction button 37 is used by the user to input data or to achieve stop or reproduction in a reproduction-mode. The menu button 38 is used to display a menu corresponding to a mode selected by the mode dial 14. Similar to the confirmation/cancellation button 36, the moving-up button 40up, the moving-right button 40ri, the moving-down button 40lo, and the moving-left button 40le are also used when the user sets up each mode.

Referring to FIGS. 1 through 4, the overall functions of the digital camera 1 of FIG. 1 will now be described. When a user presses the representative-voice button included in a user input unit INP of FIG. 4, a representative-voice request signal is generated, commanding production of a new directory and a representative-voice file corresponding to the new directory. In response to the representative-voice request signal, a digital signal processor 507 of FIG. 4 executes a data file storing algorithm as illustrated in FIG. 5.

Figure 12:
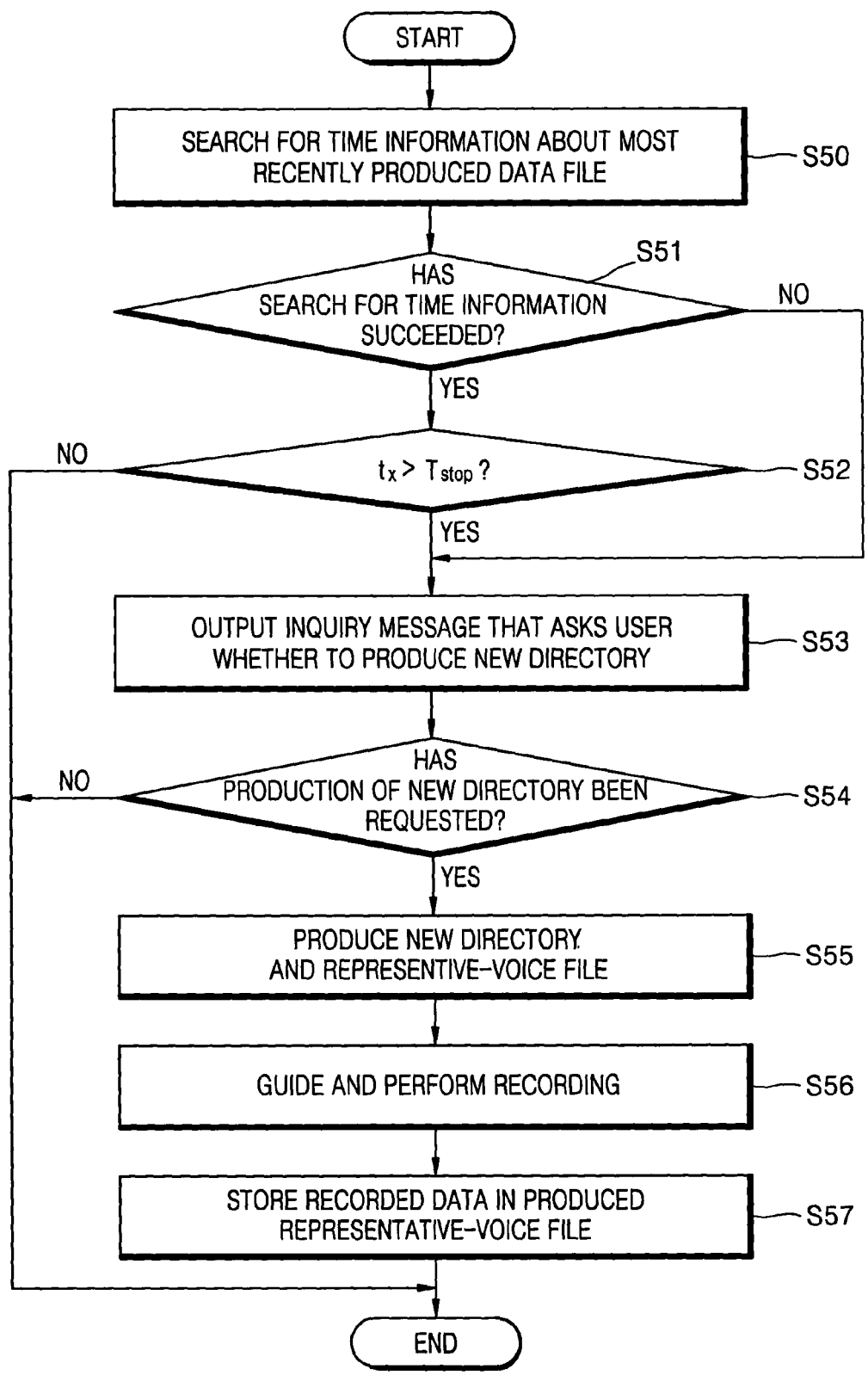
FIG. 12 is a flowchart for illustrating a directory-production algorithm performed in the digital signal processor of FIG. 4 according to the timing diagram of FIG. 11.

When operating power is applied to the digital camera 1 or the function-selection button 15 included in the user input unit INP generates a photographing-mode signal, the digital signal processor 507 executes a directory-production algorithm as illustrated in FIG. 12. The photographing-mode signal denotes one of a still image photographing-mode signal, a night view photographing-mode signal, and a moving image photographing-mode signal.

When the function-selection button 15 included in the user input unit INP generates a reproduction-mode signal, the digital signal processor 507 executes a data file reproduction algorithm as illustrated in FIG. 13.

Figure 3:
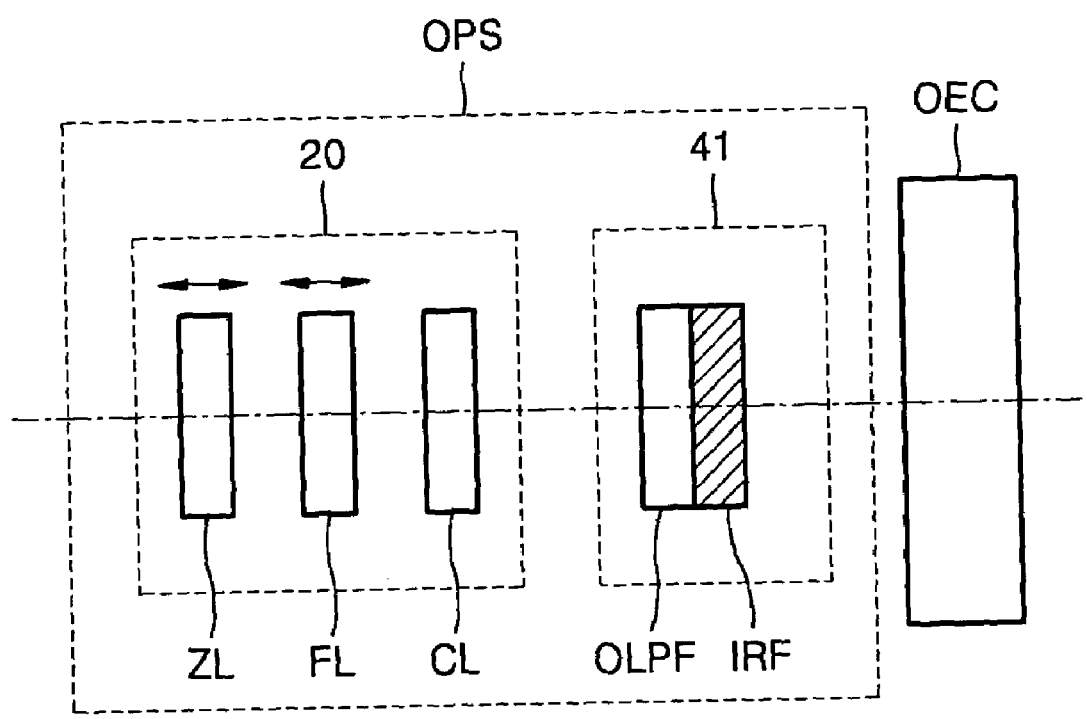
FIG. 3 is a schematic representation of an optical system of the digital camera of FIG. 1.

As illustrated in FIG. 3, an optical system OPS including the lens unit 20 and a filter unit 41 optically processes light received from an object.

The lens unit 20 includes a zoom lens ZL, a focusing lens FL, and a compensation lens CL.

Figure 4:
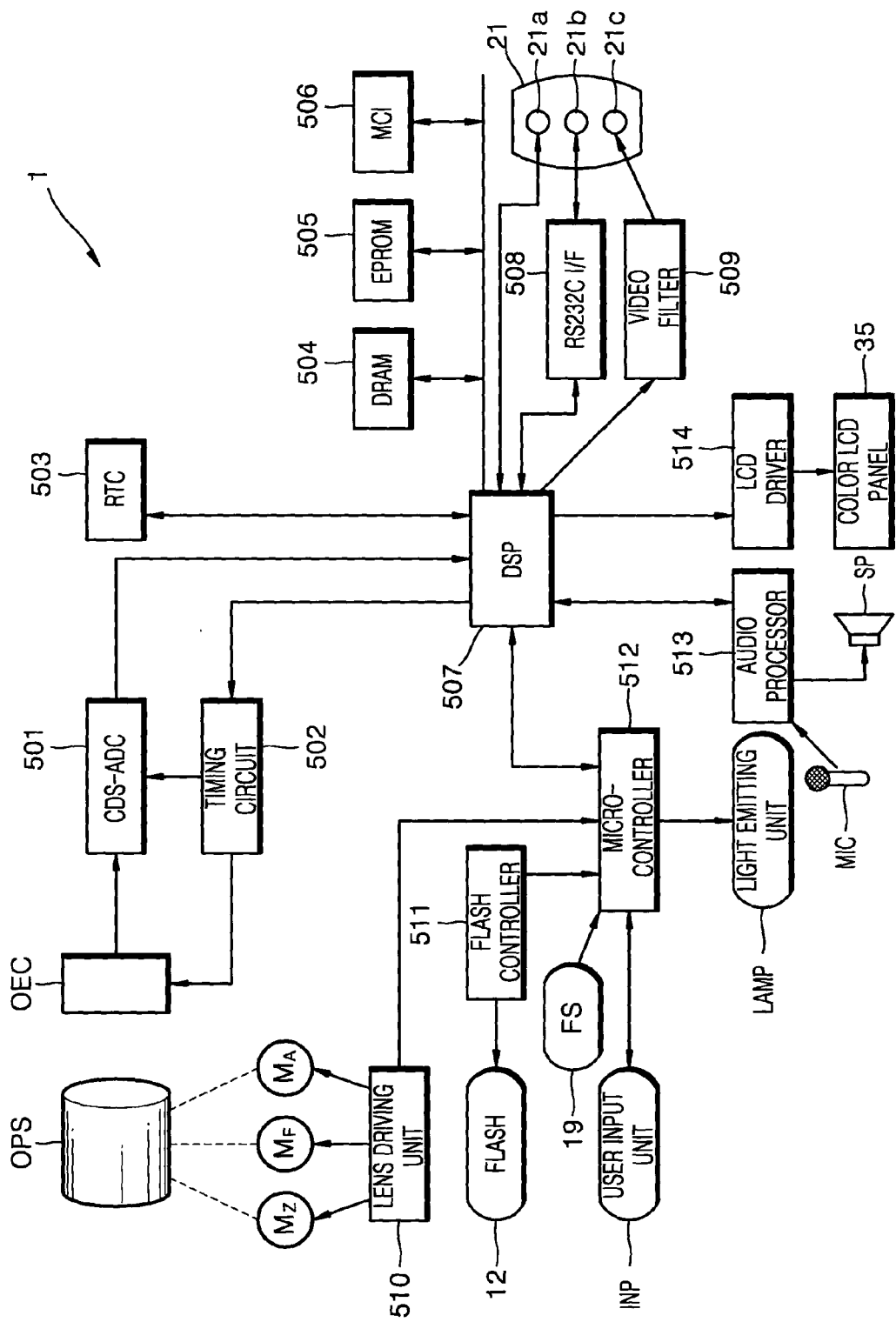
FIG. 4 a block diagram of the digital camera of FIG. 1.
Figure 5:
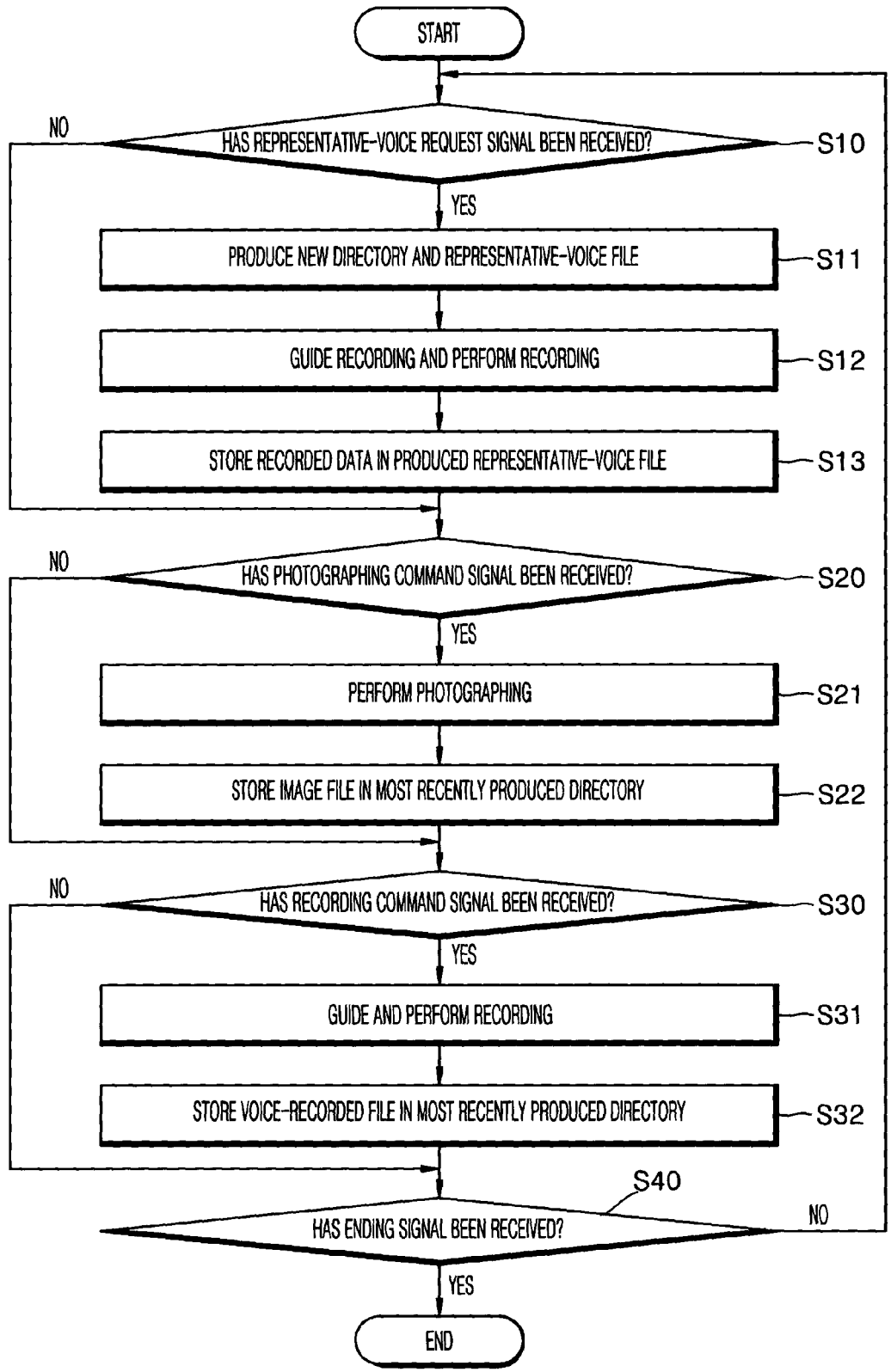
FIG. 5 is a flowchart illustrating a data file storing algorithm of the digital signal processor of FIG. 4.

When a user depresses the wide angle zoom button 39w or the telephoto zoom button 39t, which are included in the user input unit INP of FIG. 4, a signal resulting from the operation of the wide angle zoom button 39w or the telephoto zoom button 39t, respectively, is applied to a micro-controller 512. As the micro-controller 512 consequently controls the operation of a lens-driving unit 510, a zoom motor ($M_z$) is driven, and the zoom lens ZL moves. In other words, if the wide angle zoom button 39w is depressed, the focal length of the zoom lens ZL is shortened, and accordingly, the angle of view of the zoom lens widens. If the telephoto zoom button 39t is depressed, the focal length of the zoom lens ZL increases, and accordingly, an angle of view of the zoom lens narrows. Due to this characteristic, the micro-controller 512 can obtain an angle of view associated with the location of the zoom lens ZL based on the design data of the optical system OPS. Because the location of the focusing lens FL is adjusted when the location of the zoom lens ZL has been set, the angle of view is minimally affected by the location of the focusing lens FL.

When the object is focused automatically or manually, the current location of the focusing lens FL changes depending on the distance to the object. The micro-controller 512 obtains the distance between the object and the focusing lens FL based on the design data of the optical system OPS. In an automatic focusing mode, a focusing motor ($M_F$) is driven by the operation of the lens driving unit 510 controlled by the micro-controller 512. As a result, the focusing lens FL moves throughout its range of motion, typically from the front end to the rear end thereof. During this process, the location of the focusing lens FL, where the radio frequency components of an image signal are maximized, is set up. For example, the number of driving steps of the focusing monitor $M_F$ is set up.

The compensation lens CL is not driven independently since it compensates for the overall refractive index. Reference character $M_A$ denotes a motor for driving an aperture (not shown for purposes of simplicity and clarity).

In the filter unit 41 of the optical system OPS, an optical low pass filter OLPF removes optical noise in the radio frequency components from the incident light. An infrared cut filter IRF alternates infrared components in the incident light.

A photoelectric converter OEC comprises a charge coupled device (CCD) or a complementary metal-oxide-semiconductor (CMOS) to convert light received from the OPS into an electrical analog signal. A digital signal processor (DSP) 507 controls a timing circuit 502 to control the operations of the photoelectric converter OEC and a correlation double sampler and analog-to-digital converter (CDS-ADC) 501. The CDS-ADC 501 processes an analog signal received from the photoelectric converter OEC, removes radio frequency noise from the analog signal, adjusts the amplitude of the analog signal, and converts the resulting analog signal into a digital signal. The DSP 507, which operates under control of the micro-controller 512, processes the digital signal received from the CDS-ADC 501 so that the digital signal is divided into a luminance signal and a chrominance signal.

A light-emitting unit LAMP, which is driven by the micro-controller 512, includes the self-timer lamp 11, the auto-focusing lamp 33, and the flash standby lamp 34. The user input unit INP includes the shutter button 13, the mode dial 14, the function-selection button 15, the function-block button 18, the monitor button 32, the confirmation/cancellation button 36, the enter/reproduction button 37, the menu button 38, the wide angle zoom button 39*w*, the telephoto-zoom button 39*t*, the moving-up button 40*up*, the moving-right button 40*ri*, the moving-down button 40*lo*, and the moving-left button 40*1e*.

A dynamic random access memory (DRAM) 504 temporarily stores the digital image signal received from the DSP 507. An erasable programmable read only memory (EPROM) 505 stores algorithms and setup data, which are necessary for the operation of the DSP 507. A user's memory card is selectively engaged with or detached from a memory card interface (MCI) 506.

The digital image signal output from the DSP 507 is applied to an LCD driver 514, and accordingly, an object image is displayed on a color LCD panel 35.

The digital image signal output from the DSP 507 can be transmitted in a serial communication manner, for example, either via a universal serial bus (USB) connector 21*a* or via an RS232C interface 508 and its connector 21*b*. Alternatively, the digital image signal output from the DSP 507 may pass through a video filter 509 and a video output unit 21*c* and be transmitted as a video signal. The DSP 507 may include a microcontroller, for example, a ZR-36410 device manufactured by ZORAN in U.S.A.

An audio processor 513 supplies an audio signal received from a microphone MIC to the DSP 507 or a speaker SP and outputs an audio signal received from the DSP 507 to the speaker SP.

Meanwhile, the micro-controller 512 controls the operation of a flash controller 511 according to a signal received from the flash-light amount sensor 19 of FIG. 1 so that the flash controller 511 can drive the electric flash 12 of FIG. 1.

The data file storing algorithm of the DSP 507 of FIG. 4 will now be described with reference to FIGS. 4 and 5.

First, when a representative-voice request signal is received via the user input unit INP in step S10, a new directory and a new representative-voice file corresponding to the new directory is produced and stored in a recording medium such as a memory card inserted into the MCI 506, in step S11. Thereafter, in step S12, while the audio processor 513 and/or the LCD driver 514 reproduce a recording guide, a user's voice describing the newly produced directory is recorded. An example of the directory description can be "This was photographed together with my friends, Gildong Hong and Sunja Han, in Solak Mountain on Apr. 15, 2002." In step S13, this recorded data is stored in the newly produced representative-voice file.

When a photograph command signal is received from the user via the user input unit INP in step S20, the user takes a photograph using the digital camera, in step S21. Next, in step S22, a resultant image file and/or voice file, which serves as a user data file, is stored in the newly or most recently produced directory.

When a recording command signal is received from the user via the user input unit INP in step S30, the audio processor 513 and/or the LCD driver 514 provide a guide to the user for recording a voice message, and then, the user's voice is recorded, in step S31. Then, in step S32, a recorded voice file, which serves as a user data file, is stored in the most recently produced directory.

These steps are repeated until an ending signal is received, in step S40.

Figure 6:
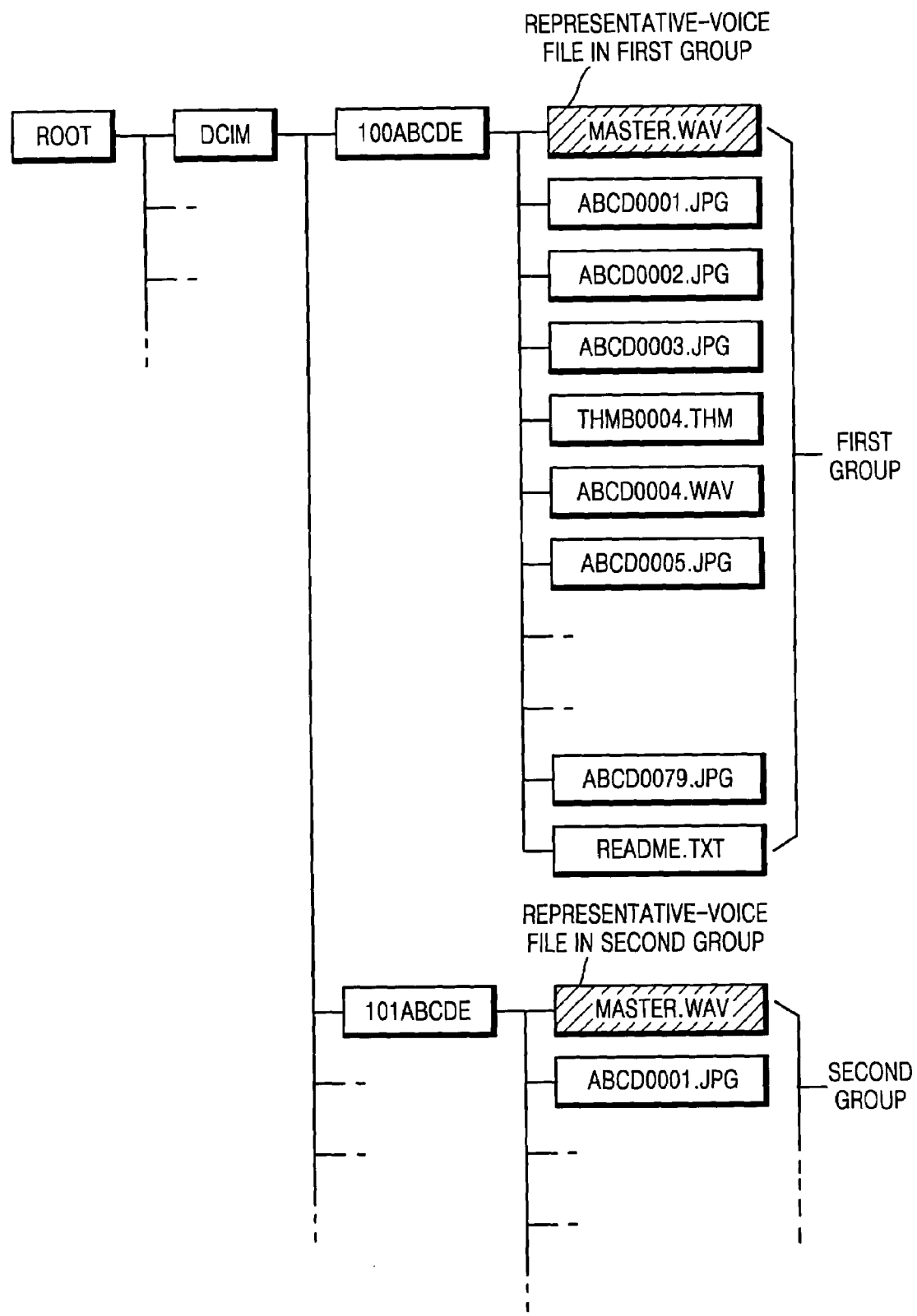
FIG. 6 is a block diagram of a first data file storage structure produced by execution of the algorithm of FIG. 5.

FIG. 6 is a block diagram of a first data file storage structure produced by execution of the algorithm of FIG. 5.

Referring to FIG. 6, directories "DCIM" for storing the user's data files are produced under a top directory "ROOT". Sub-directories, for example, "100ABCDE", "101ABCDE", and the like, exist under each of the directories "DCIM". The sub-directories are produced every time a representative-voice request signal is received from a user. "100ABCDE" and "101ABCDE" are the names of sub-directories.

The first directory "100ABCDE" stores its corresponding representative-voice file "MASTER.WAV" and user data files. Similarly, the second directory "101ABCDE" stores its corresponding representative-voice file "MASTER.WAV" and user data files. Because all representative-voice files are stored in their corresponding directories, they are each given the same file name, for example, "MASTER.WAV". The first directory "100ABCDE" forms a first group of files, and the second directory "101ABCDE" forms a second group of files.

Figure 7:
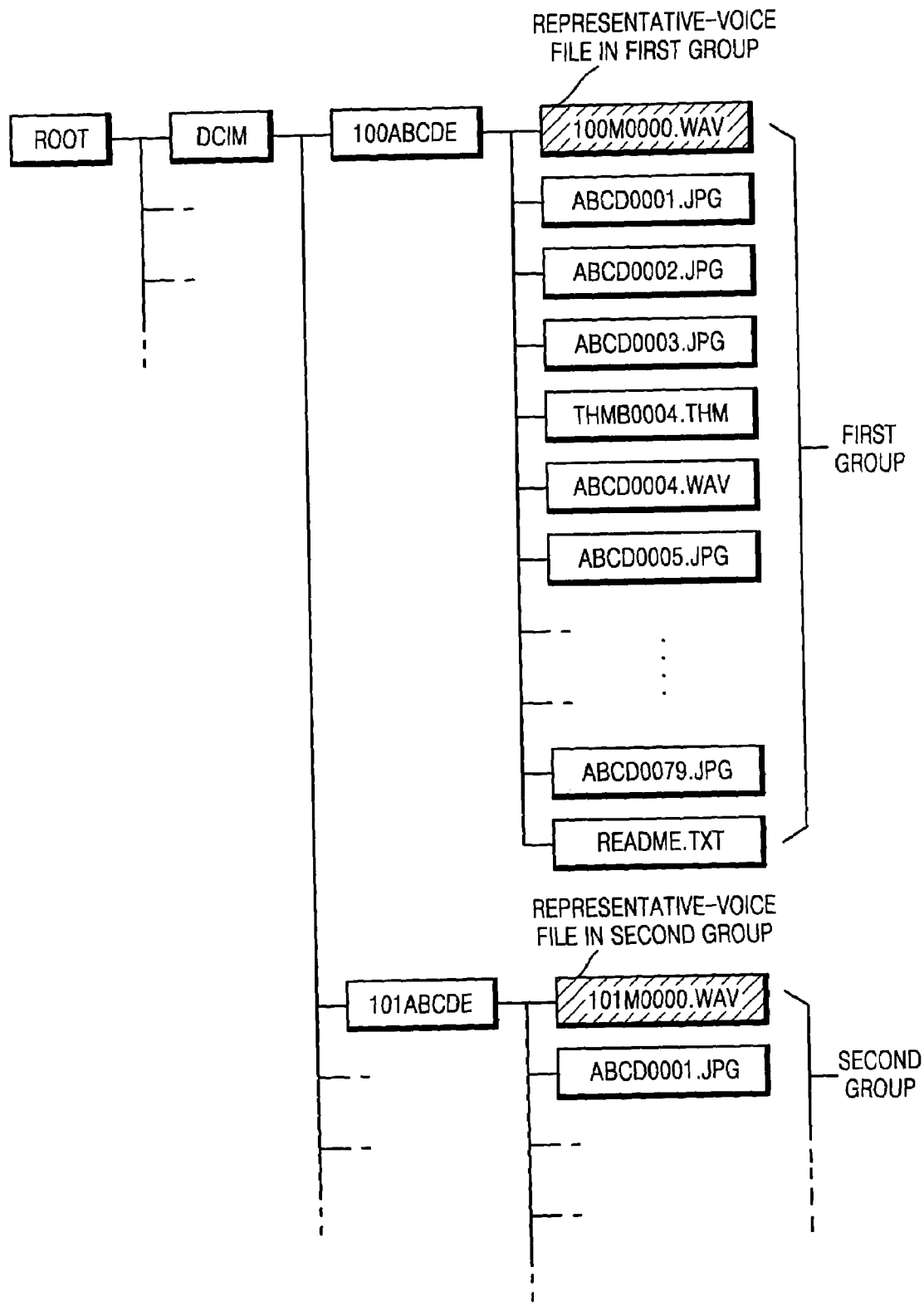
FIG. 7 is a block diagram of a second data file storage structure produced by execution of the algorithm of FIG. 5.

FIG. 7 shows a second data file storage structure produced by execution of the algorithm of FIG. 5 in accordance with another embodiment of the present invention. Referring to FIG. 7, directories "DCIM" for storing the user's data files are produced under a top directory "ROOT". Sub-directories, for example, "100ABCDE", "101ABCDE", and the like, exist under each of the directories "DCIM". The sub-directories are produced every time a representative-voice request signal is received from a user. "100ABCDE" and "101ABCDE" are the names of sub-directories.

The first directory "100ABCDE" stores its corresponding representative-voice file "100M00000.WAV" and user data files. Similarly, the second directory "101ABCDE" stores its corresponding representative-voice file "101 M00000.WAV" and user data files. The file name of each of the produced representative-voice files includes the index part of its corresponding directory name, for example, "100" or "101". The first directory "100ABCDE" forms a first group of files, and the second directory "101ABCDE" forms a second group of files.

Figure 8:
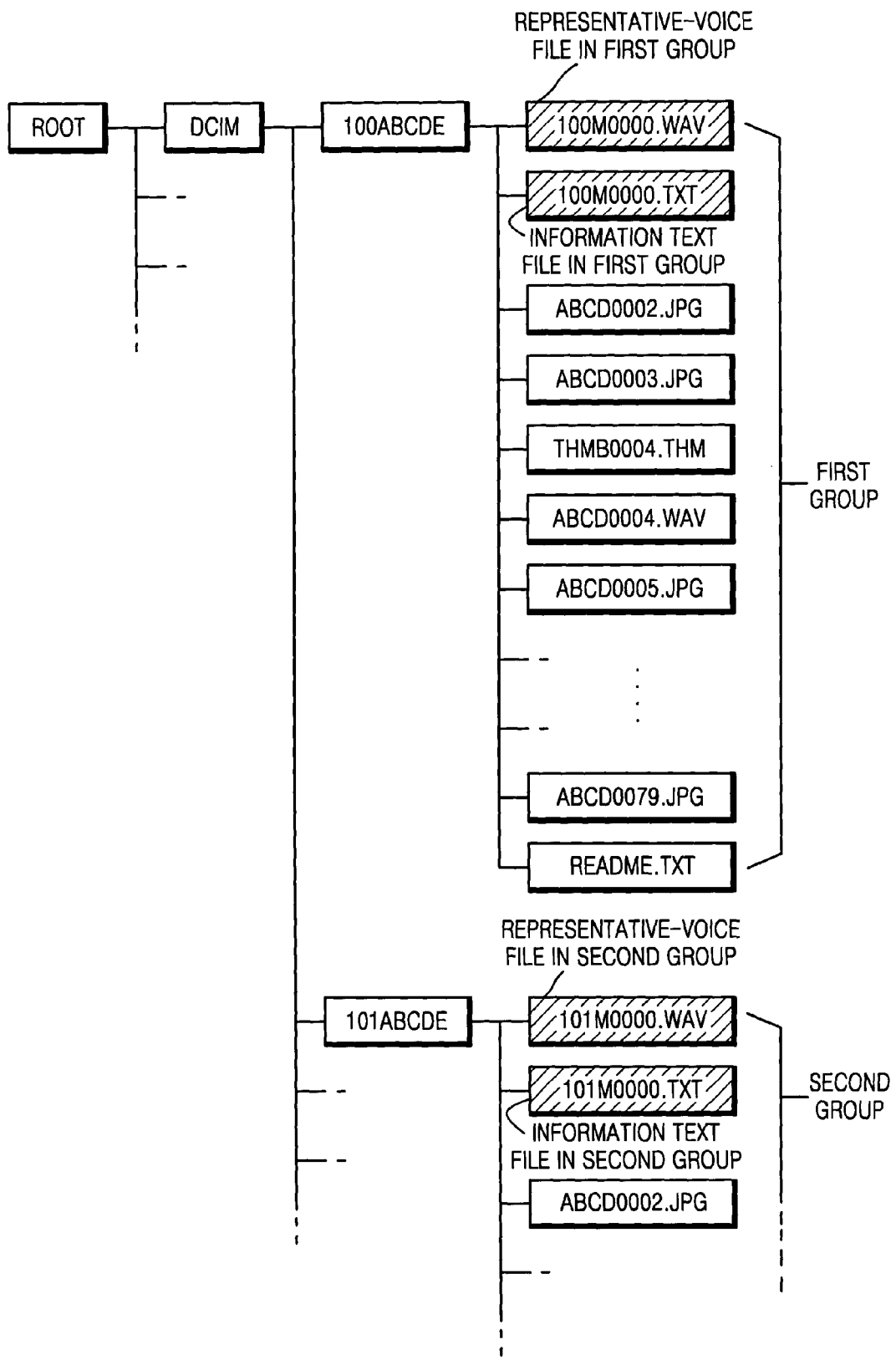
FIG. 8 is a block diagram of a third data file storage structure produced by execution of the algorithm of FIG. 5.

FIG. 8 shows a third data file storage structure produced by execution of the algorithm of FIG. 5 in accordance with a further embodiment of the present invention. Only the features of FIG. 8 differing from FIG. 7 are described for purposes of simplicity. Information text files such as "100M0000.TXT" and "101M0000.TXT" are additionally produced in their directories, for example, "100ABCDE" and "101ABCDE", respectively. The file name of each of the produced information text files includes the index part of its corresponding directory name, for example, "100" or "101". Each directory forms a group of files. Each of the information text files includes data associated with its corresponding directory, such as, the number of times photographs were taken, the number of moving image files, the time the first photograph was taken, and the time the final photograph was taken.

Figure 9:
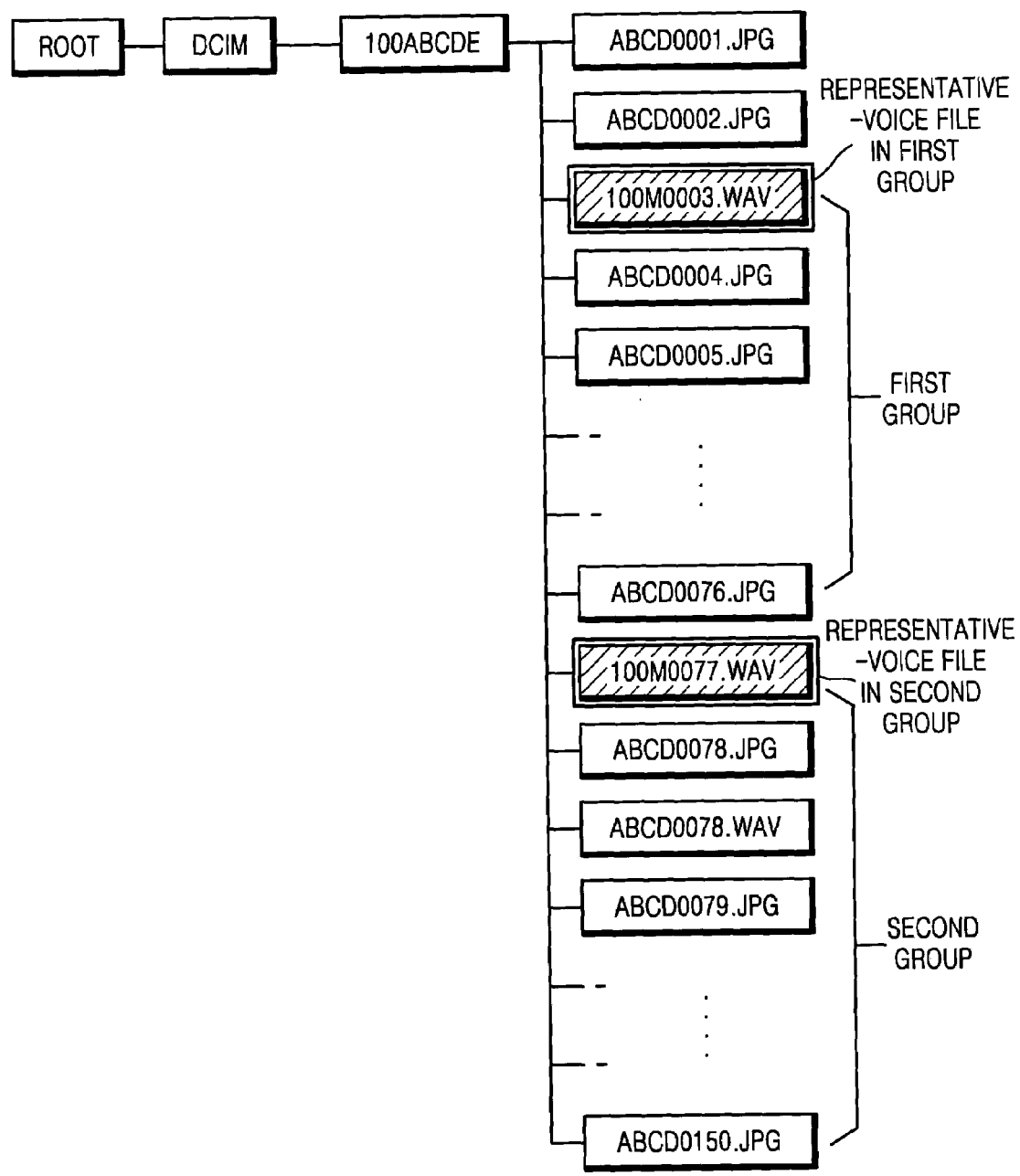
FIG. 9 is a block diagram of a fourth data file storage structure produced by execution of the algorithm of FIG. 5.

FIG. 9 shows a fourth data file storage structure produced by execution of the algorithm of FIG. 5 in accordance with a further embodiment of the present invention. Referring to FIG. 9, directories "DCIM" and "100ABCDE" for storing the user's data files are produced under a top directory "ROOT". All of the files produced by the user are sequentially stored in the directory "100ABCDE". The index of each of the file names is determined according to the sequence of storing the files.

Hence, all of the data files existing between two representative-voice files are included in a virtual directory. For example, stored data files "ABCD0004" through "ABCD0076" between two representative-voice files "100M003.WAV" and "100M0077.WAV" are included in a virtual directory. The virtual directory forms a group of files. In FIG. 9, "100M003.WAV" and "100M0077.WAV" are the representative-voice files of each group. Data files such as "ABCD0001.JPG" and "ABCD0002.JPG" not preceded by any representative-voice files denote data files that are produced when the representative-voice button 42 of FIG. 2 is not pressed.

Figure 10:
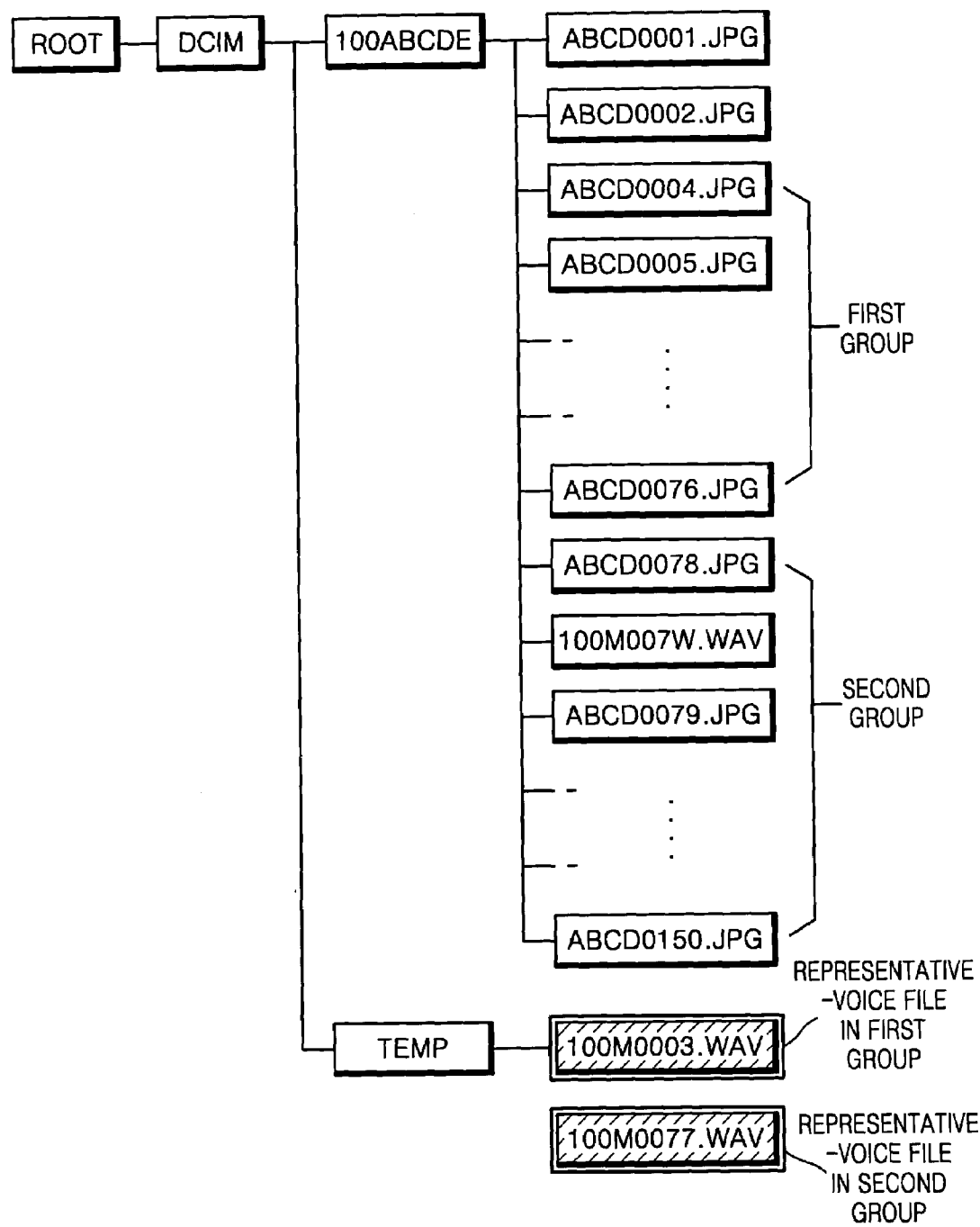
FIG. 10 is a block diagram of a fifth data file storage structure produced by execution of the algorithm of FIG. 5.

FIG. 10 shows a fifth data file storage structure produced by execution of the algorithm of FIG. 5 in accordance with a still further embodiment of the invention. A feature of FIG. 10 different from FIG. 9 is storing representative-voice files, for example, "100M0003.WAV" and "100M0077.WAV", in a separate specific directory, for example, "TEMP".

Figure 11:
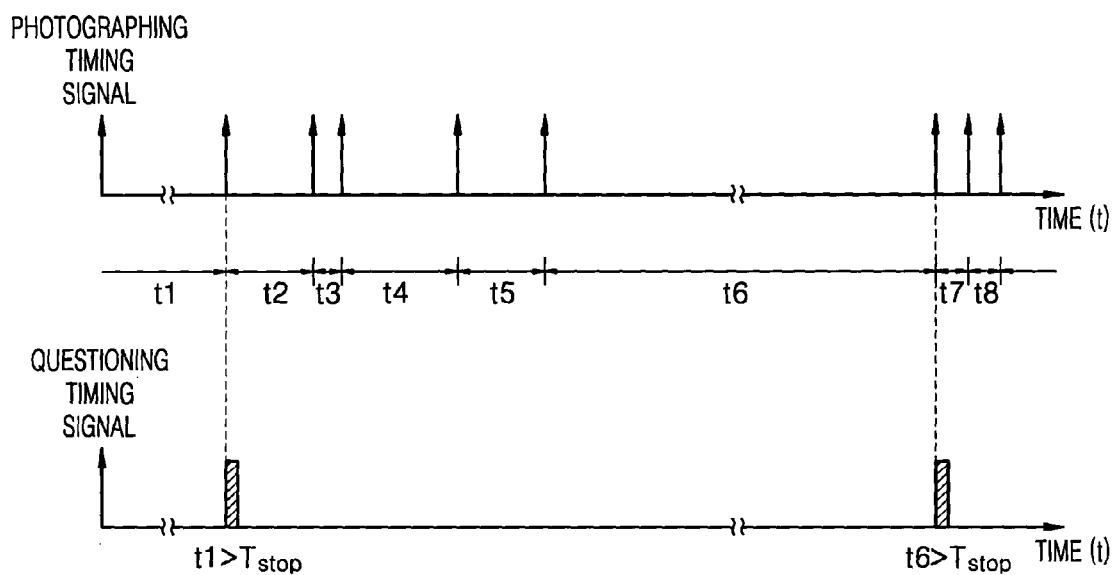
FIG. 11 is a timing diagram showing the points in time when the digital signal processor of FIG. 4 outputs a message asking a user whether to produce a directory.

FIG. 11 shows points in time at which an inquiry message originated from the DSP 507 of FIG. 4 asks a user whether to produce a new directory. FIG. 12 illustrates a directory-production algorithm performed in the DSP of FIG. 4 according to the timing diagram of FIG. 11. The algorithm of FIG. 12 is performed when operating power is applied to the digital camera 1 of FIG. 1 or a photograph mode signal is received from a user. The directory-production algorithm of FIG. 12 will now be described step by step with reference to FIGS. 4, 11, and 12.

First, in step S50, time information about the most recently produced data file is searched for. Then, if the search for the time information has failed in step S51 or if an amount of time ($t_x$) that has elapsed from the time at which the most recently produced data file was produced to the current time is longer than a reference time ($t_{stop}$) (step S52), an inquiry message is output that asks a user whether to produce a new directory, in step S53.

Thereafter, if a user command signal that commands production of a new directory is received in step S54, the new directory and a new representative-voice file corresponding to the new directory are produced in a memory card inserted into the MCI 506, in step S55. Thereafter, in step S56, while the audio processor 513 and/or the LCD driver 514 are reproducing a recording guide, a user's voice describing the newly produced directory is recorded. An example of the directory description can be "This was photographed together with my friends, Gildong Hong and Sunja Han, in Solak Mountain on Apr. 15, 2002." In step S57, the recorded data is stored in the newly produced representative-voice file.

Figure 14A:
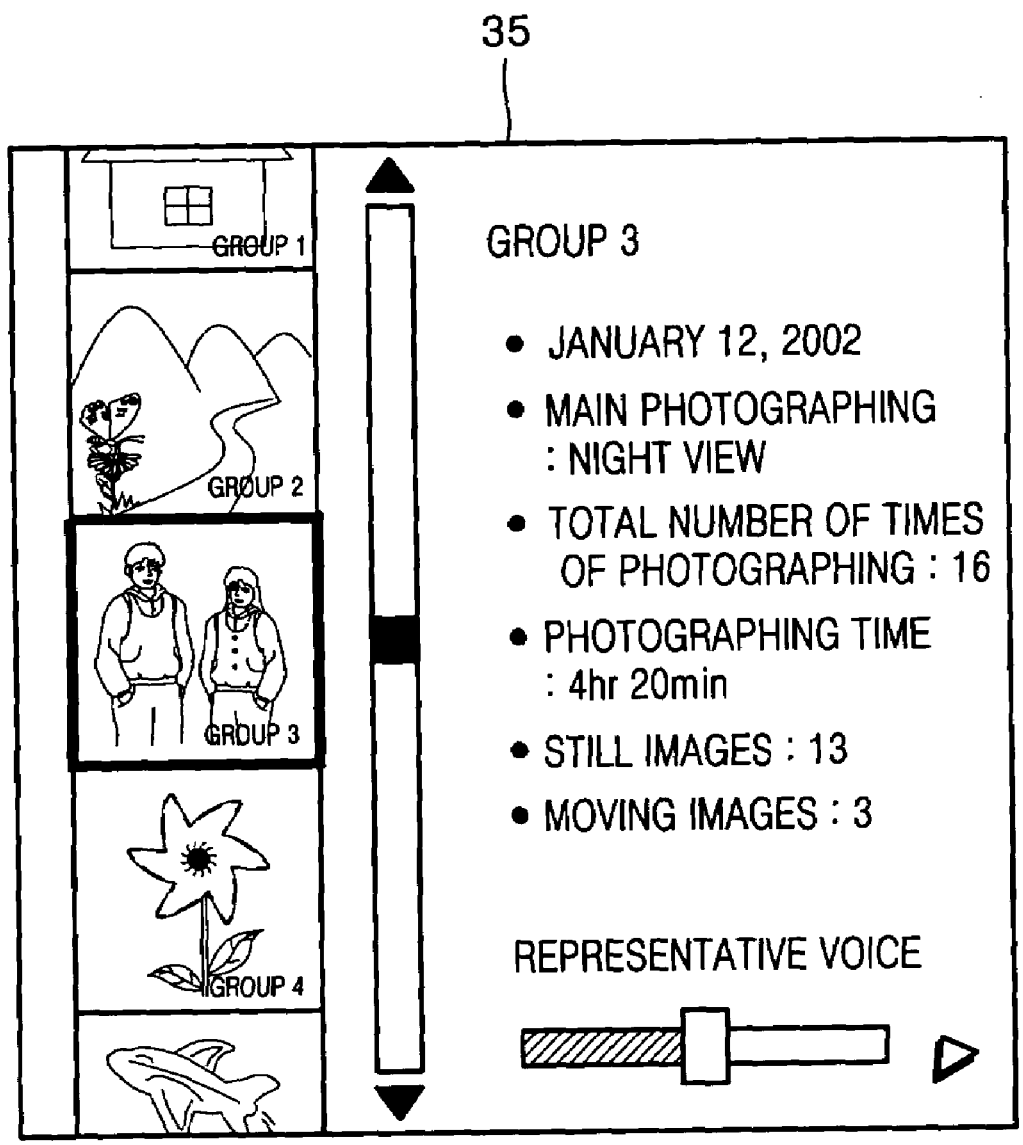
FIG. 14A shows a picture displayed on a color LCD panel of FIGS. 2 and 4 at a point in time when step S72 of the algorithm of FIG. 13 is executed.
Figure 14B:
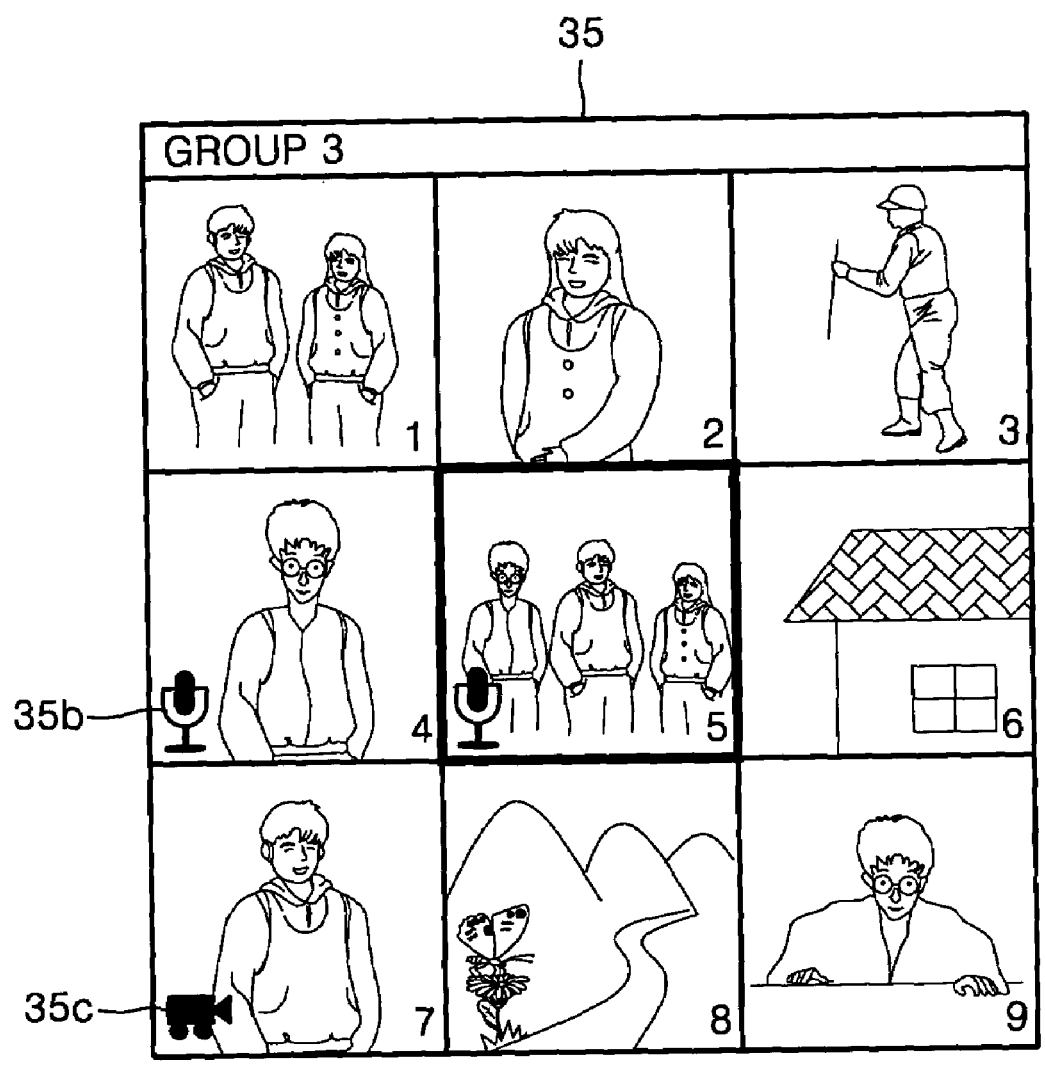
FIG. 14B shows a picture displayed on the color LCD panel of FIGS. 2 and 4 at a point in time when step S82 of the algorithm of FIG. 13 is executed.
Figure 14C:
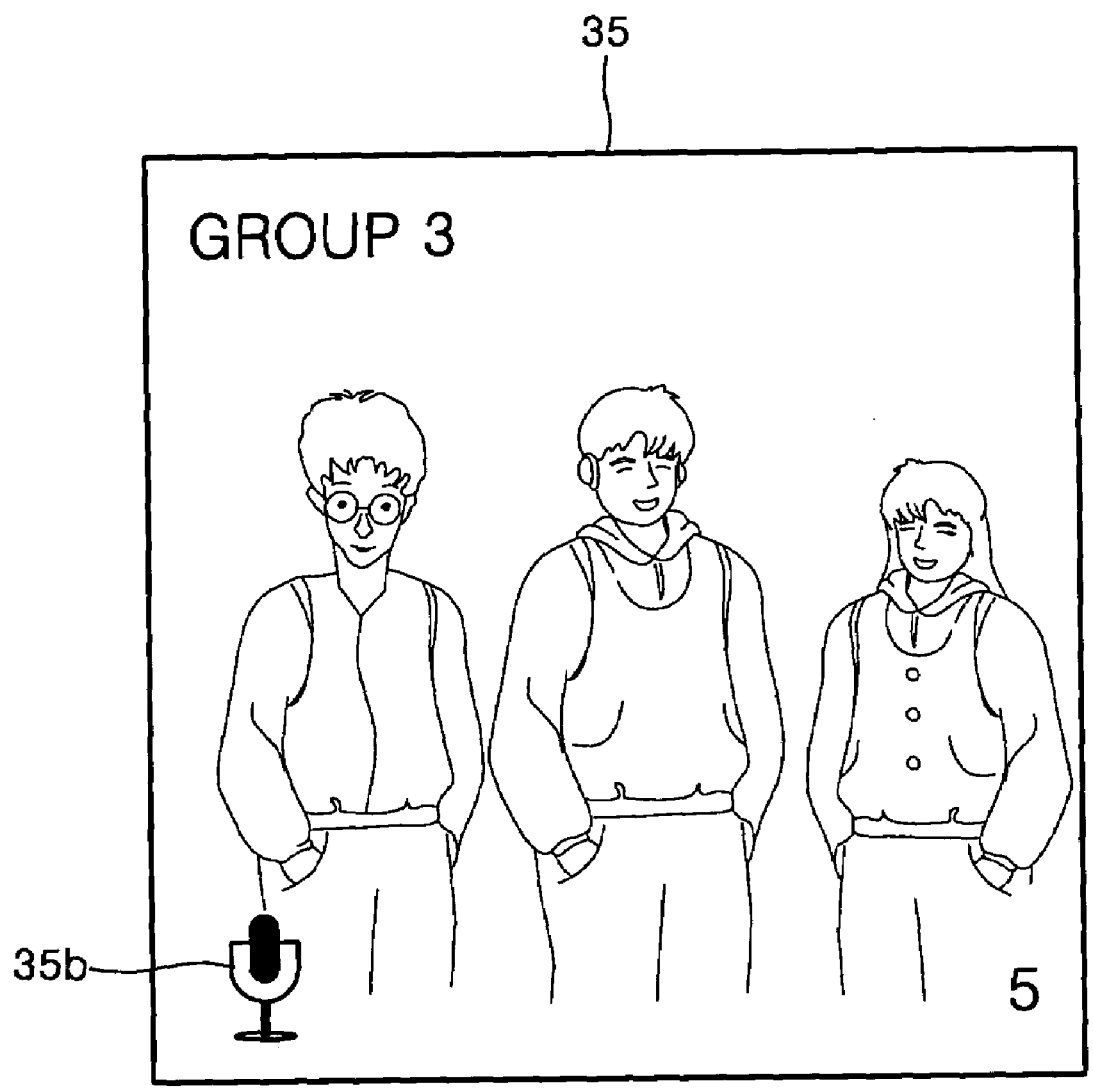
FIG. 14C shows a picture displayed on the color LCD panel of FIGS. 2 and 4 at a point in time when step S90 of the algorithm of FIG. 13 is executed.

FIG. 13 illustrates a data file reproduction algorithm performed in the DSP 507 of FIG. 4. FIG. 14A shows a picture displayed on the color LCD panel 35 of FIGS. 2 and 4 at a time when step S72 of the algorithm of FIG. 13 is executed. FIG. 14B shows a picture displayed on the color LCD panel 35 of FIGS. 2 and 4 at a time when step S82 of the algorithm of FIG. 13 is executed. FIG. 14C shows a picture displayed on the color LCD panel 35 of FIGS. 2 and 4 at a time when step S90 of the algorithm of FIG. 13 is executed. The data file reproduction algorithm of the DSP 507 will now be described with reference to FIGS. 4 and 13 through 14C. When a reproduction-mode signal used to reproduce data files is received through the user input unit INP, the DSP 507 executes the following data file reproduction algorithm.

First, in step S60, directory information stored in a memory card, which is a recording medium, is read out. Next, in step S61, representative-image files each corresponding to a respective directory produced and stored in the memory card are displayed on the color LCD panel 35.

Then, if the DSP 507 receives a signal requesting selection of a representative-image file from the user input unit INP via the microcontroller 512 in step S62, directory information of the selected representative-image file is displayed on the color LCD panel 35, in step S70 (refer to FIG. 14A).

Thereafter, if the DSP 507 receives a signal requesting reproduction of a representative-voice file from the user input unit INP via the micro-controller 52 in step S71, a representative-voice file is reproduced from the directory of the selected representative-image file, in step S72. For example, a representative-voice file having the content "This was photographed together with my friends, Gildong Hong and Sunja Han, in Solak Mountain on Apr. 15, 2002." is reproduced. Alternatively, when a representative-image file is selected, its corresponding representative-voice file may be automatically reproduced.

If a signal requesting re-selection of a representative-image file is received from the user input unit INP in step S73, all of the image files stored in the directory corresponding to the re-selected representative-image file are displayed on the color LCD panel 35, in step S80 (refer to FIG. 14B). If an image file (e.g., a seventh image file No. 7) is a moving image file, the image file is displayed with a moving image mark 35c on the screen of the first frame. If an image file (e.g., a file No. 4 or No. 5) includes a voice data file, the image file is displayed with a voice file mark 35b.

Thereafter, in step S81, if a picture return signal is received from the user input unit INP, the method goes back to step S61. If not, steps following step S81 are performed.

If a signal requesting selection of an image file is received from the user input unit INP in step S82, the selected image file is magnified and displayed, in step S90 (refer to FIG. 14C). Next, if the DSP 507 receives a signal requesting reproduction of a voice file from the user input unit INP via the micro-controller 512 in step S91, a voice file corresponding to the selected image file is reproduced, in step S92. For example, a voice file having a content "This was photographed together with Gildong Hong and Sunja Han at the entrance of Solak Mt." is reproduced. Alternatively, when an image file is selected, its corresponding voice file may be automatically reproduced.

Thereafter, if an ending signal is received from the user input unit INP, the execution of the data file reproduction algorithm is concluded, in step S93. Otherwise, it is determined in step S94 whether a return signal is received from the user input unit INP. If the return signal is received in step S94, the method goes back to step S80. Otherwise, step S91 is performed.

As described above, in a data file managing method according to the present invention, the user's data files are stored in directories corresponding to representative-voice files, the representative-data file of each of the directories is displayed in a reproduction-mode, and a representative-voice file is reproduced according to a reproduction request signal generated by a user. Thus, the user of a portable digital apparatus can easily manage his or her data files without using an extra apparatus.

While the present invention has been particularly shown and described with reference to exemplary embodiments thereof, it will be understood by those of ordinary skill in the art that various changes in form and details may be made therein without departing from the spirit and scope of the present invention as defined by the claims.

What is claimed is:

1. A method managing data files ina portable digital apparatus having a display device and an interface for a removable recording medium, the removable recording medium being coupled with the interface of the portable digital apparatus, the removable recording medium having at least one directory therein, the method comprising the steps of:

producing a new directory and a representative-voice file corresponding to the new directory in the removable recording medium, when a representative-voice request signal is recieved from a user;

reproducing a guide to the user for recording representative voice data;

storing representative-voice data recieved from the user in the representative-voice file;

storing a user data file in the new directory;

selectively displaying a representative data file of at least one of the directories in the removable recording medium; and reproducing a representative-voice file corresponding to a directory of a representative data file selected by the user.

2. The method of claim 1, wherein the representative-voice file reproducing step is performed when a reproduction mode signal for reproducing the representative-voice file is received from the user.

3. The method of the claim 1, wherein in the directory producing step , the representative-voice file corresponding to the new directory is stored in the new directory.

4. The method of claim 1, wherein in a plurality of representative-voice files each have the same file name are stored in the removable recording medium and wherein producing the new directory comprises assigning the same file name to the new directory.

5. The method of claim 1, comprising assigning a name to the representative-voice file including an index of the new directory.

6. The method of claim 1, comprising producing information text file for the new directory.

7. The of claim 1, further comprising the steps of:

comparing a time elapsed from a time at which a user data file was most recently produced to a current time with a reference time, if operating power is applied to the portable digital apparatus or a photographing-mode signal has been received from the user; and outputting an inquiry message that asks the user whether to produce a new directory, if the time elapsed is longer than the reference time.

8. The method of claim 1, comprising selecting a further representative-data file, and displaying all of the data files stored in the directory of the further representative-data file.

9. A method of managing data files in a portable digital apparatus coupled with a recording medium having at least one pre-existing directory, the portable digital apparatus having a display device, the method comprising the steps of:

comparing a time elapsed from a time at which a data file was most recently produced to a current time with a reference time, if operating power is applied to the portable digital apparatus or a photographing-mode signal has been received from a user;

outputting an inquiry message that asks the user whether to produce a new directory, if the time elapsed is longer than the reference time; and producing a new directory in the recording medium, if a directory request signal is received from the user.

* * * * *